Jan. 14, 1964 W. J. HAYDEN 3,117,555
HOG RESTRAINING IMPLEMENT
Filed June 26, 1962 2 Sheets-Sheet 1

William J. Hayden
INVENTOR.

Jan. 14, 1964 W. J. HAYDEN 3,117,555
HOG RESTRAINING IMPLEMENT
Filed June 26, 1962 2 Sheets-Sheet 2
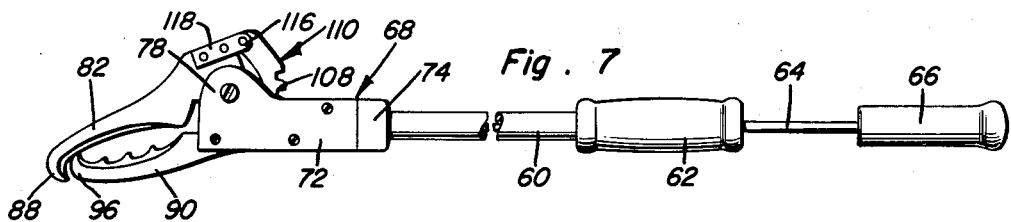
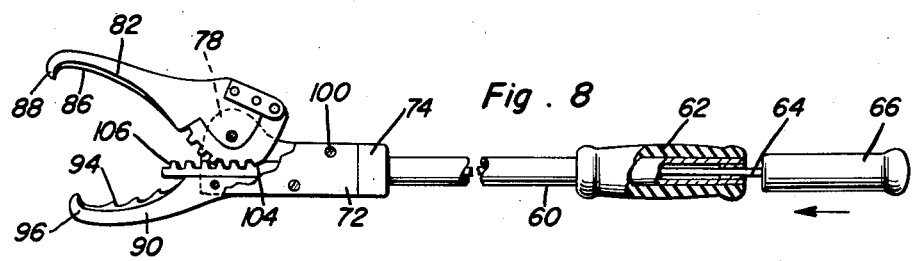
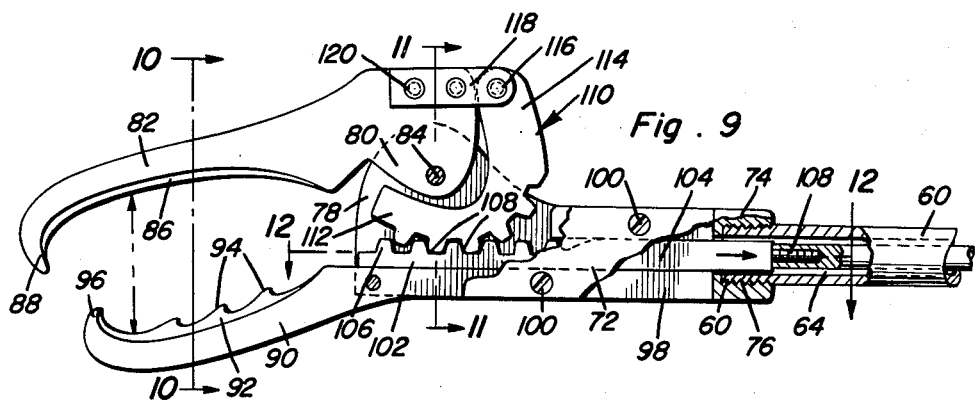
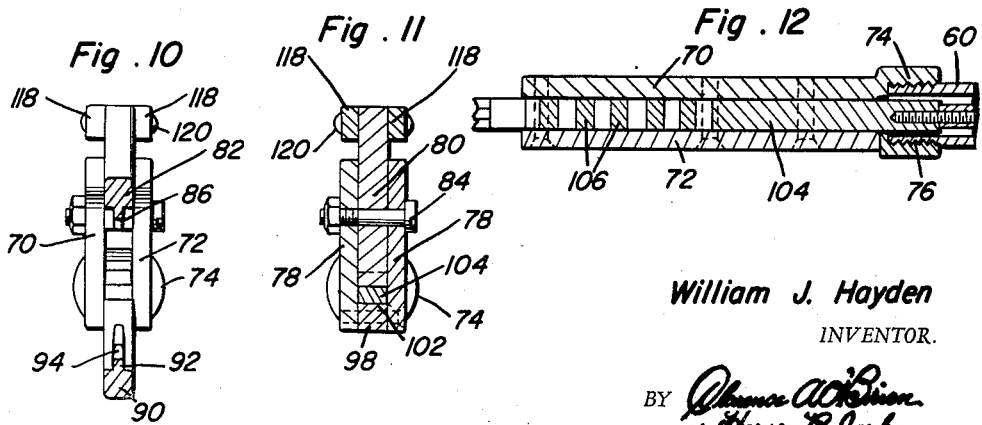
William J. Hayden
INVENTOR.

United States Patent Office 3,117,555
Patented Jan. 14, 1964

3,117,555
HOG RESTRAINING IMPLEMENT
William J. Hayden, 345 N. Jefferson St., Marshall, Mo.
Filed June 26, 1962, Ser. No. 207,450
7 Claims. (Cl. 119—154)

The present invention relates to an improved manually usable implement which is expressly constructed and designed to enable the user thereof to catch hold of and restrain an unruly animal, for example, a difficult-to-control hog for such purposes as the occasion may demand.

Although the implement constitutes a satisfactory aid which is helpful to a veterinarian when it is necessary to hold a hog for purposes of giving shots and other requirements, it is such that it provides the user with simple practical and efficient means for catching, holding and releasing the animal in keeping with the requirements of the restraining task at hand.

As will be hereinafter evident the concept has to do with two embodiments which will be comprehended generically and specifically. Generically speaking it is to be explained that in both embodiments or forms of the invention the specially designed and effectively performing jaws are of paramount significance and importance. Briefly one jaw is straight, rigid and integral with handle means. The second companion jaw is opposed to and pivotally mounted on an outer or distal end of the handle means and is curved lengthwise in a manner to clampingly embrace a portion of the snout of a hog and has an outer end terminating in a hooked beak which is directed toward and projects to a point slightly beyond the outer beaked end of the first jaw. Both jaws are of a length and shape in side elevation to effectually embrace the hog's snout. The inner lengthwise edge of the first-named jaw has a rib with anti-slipping teeth and the opposed cooperating inner lengthwise edge of the pivoted or second-named jaw has a longitudinal rib which is opposed to and cooperates with the teeth.

Further and from a generic standpoint the implement is characterized by an elongated handle provided at a rearward or proximal end with a handgrip and at a forward end with an oblique angled rigid stationary jaw. The handle means is provided with ears and a second jaw is pivotally mounted at its rearward end between the ears and is opposed to and cooperates with the fixed jaw. A longitudinally shiftable push-pull rod is confined and reciprocable in the bore of the handle and rearward end thereof is provided with a handgrip. An operating link affords connection between the forward portion of the push-pull rod and an extending rearward end portion of the movable jaw, the connection being in the form of an off-center or offset pivot.

For best results the first, the stationary jaw, which is straight as mentioned above, is disposed at an oblique angle relative to the distal end of the handle and has a rib along its inner lengthwise edge provided with anti-slipping teeth. These teeth coact, with requisite nicety, with a similar rib on the inner opposed edge of the second jaw, the latter jaw being pivotally mounted and curved longitudinally for best results.

Experience in the field of endeavor herein under advisement has shown that the specific construction and cooperation of the jaws is highly important for gripping and restraining an unruly animal. However, and in addition, other structural adaptations are significant if not essential. For instance, the pivot point of the movable jaw is offset in relation to the longitudinal axis of the handle. The curvature of the jaw itself causes the jaw to resemble an elongated bill terminating in a beak of requisite curvature. The terminal beaks on the stationary and movable jaws nest together with the result that the jaws, thus constructed, are remarkably efficient.

Further novelty is predicated on an implement which is such in construction and arrangement that the rearward end of the second jaw projects rearwardly beyond its pivot point. This projecting end portion provides the desired lever-action for the movable jaw. Also, by properly proportioning and arranging the link with its ends pivotally joined to the respective adjacent ends of the movable jaw and push-pull rod the link angles to one position to lock the jaws when the push-pull rod is moved toward the user. It angles to a second position when the push-pull rod is shoved forwardly in the tubular handle at which time the cooperating parts cooperate in holding the movable jaw in a spread or open position.

Then, too, novelty is predicated on a construction and arrangement wherein the pivoted rearward end of the movable jaw is provided with an on-center pivot and is equipped with means extending rearwardly of the pivot which means has an off-center pivotal connection with a link. The link in turn has a portion thereof fashioned into a gear segment, the gear teeth thereof being operatively connected with companion gear teeth on a reciprocable rack which rack in turn is connected with the aforementioned reciprocable push-pull rod.

This application for patent is a continuation-in-part of copending application Serial No. 59,599, filed September 30, 1960, allowed January 5, 1962, now abandoned.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
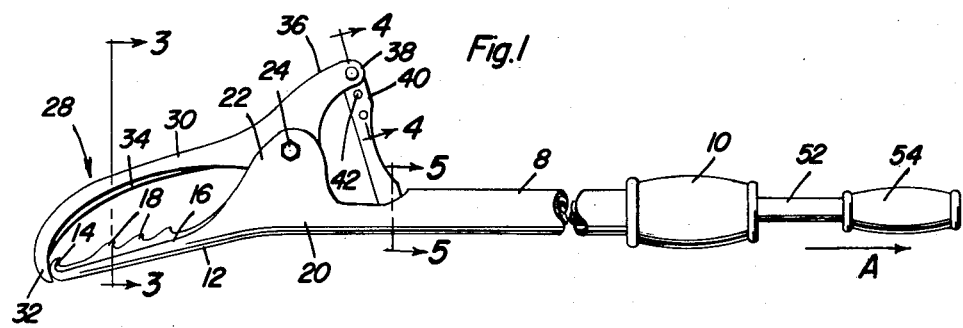
FIGURE 1 is a view in side elevation with portions broken away showing a hog restraining implement embodying the present invention, the jaws being locked in closed position.
Figures 3, 4, 5, 6:
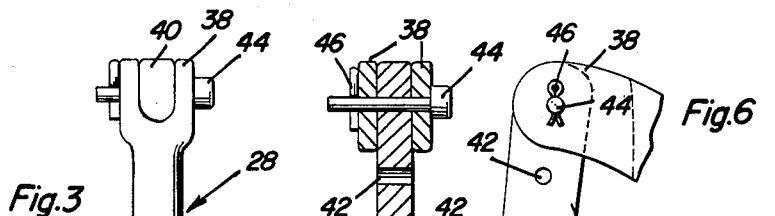

FIGURES 3, 4 and 5 are enlarged detail views taken on the section lines 3—3, 4—4 and 5—5, respectively, of FIGURE 1;

FIGURE 6 is a fragmentary elevational view showing the operating end of the movable jaw and the adjustably connected end portion of the link which is hinged or pivotally connected thereto;

FIGURE 7 is a view in side elevation of a modified form of restraining implement wherein the jaws are shown closed and held in closed relationship by the geared linkage;

FIGURE 8 is a view in side elevation with parts broken away and shown in section and based on the embodiment depicted in FIGURE 7 with the jaws open or spread apart and with the geared linkage illustrated in the manner in which it functions to achieve the open jaw position;

FIGURE 9 is a fragmentary view on a larger scale with parts in section and elevation and which functions to more clearly illustrate the component parts and a construction and arrangement and which shows the geared linkage in an intermediate position, that is a position between the respective positions illustrated in FIGURES 7 and 8; and FIGURES 10, 11 and 12 are enlarged sections taken on the planes of the section lines 10—10, 11—11 and 12—12, respectively, of FIGURE 9.

Figure 2:
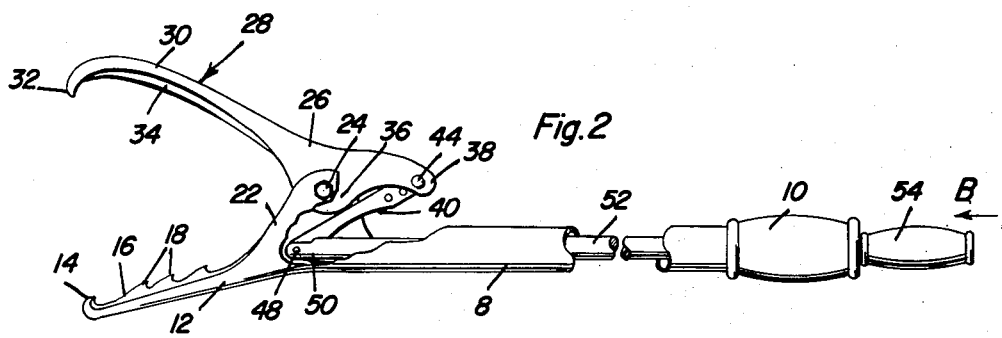
FIGURE 2 is a view similar to FIGURE 1 with additional portions broken away to expose and show the construction and relationship of essential component parts, the jaws being shown held in an open position.

Reference will be had first to FIGURES 1 to 6, inclusive. As best shown in FIGS. 1 and 2 the elongated rigid tubular reach member is denoted by the numeral 8 and constitutes an appropriate handle. It is open at its forward and rearward ends. At the rearward end it is provided with an appropriately constructed and attached handgrip 10. The left hand or forward end of this handle or reach member is provided with a first jaw 12 to be known as the relatively stationary jaw. The jaw proper is linearly straight and is pitched at a slight angle to the longitudinal axis of the handle (downwardly in the drawing) and this jaw terminates in a relatively short hook-shaped beak 14. It is provided along its inner lengthwise edge with a rib 16 having anti-slipping teeth 18 formed thereon. The junctional portion between the jaw and distal or forward end of the handle is denoted at 20 and is provided with a pair of spaced parallel ears 22 provided with a pivot pin or bolt 24 passing through a median or lug-like anchorable end 26 of the movable jaw 28. It may be pointed out here that the stationary jaw 12 is defined as the "first" jaw and the complemental or companion movable jaw 28 is defined as the "second" jaw. The main portion of the second jaw is longitudinally bowed as at 30 to define an attenuated bill. This bill is such that the leading or forward end may be fashioned into a pointed return bend defining a second hook-like beak 32 which cooperates with the shorter beak 14. This arrangement involving the straight fixed jaw 12 and curved bill-like movable jaw 28 plus the beaks 14 and 32 constitutes a highly satisfactory grapple for catching hold of and embracing the snout of the animal. As a further feature, it will be noted that the inner longitudinal edge of the movable jaw has a correspondingly curved longitudinally extending rib 34. This rib is of the non-circular cross-section shown in FIG. 3. It is positioned so that it lines up with the toothed rib 16. These features together provide an ideal gripping action. It will be noted that the rear end portion 36 of the movable jaw projects to the right of the pivot point 24 and terminates in a bifurcated end defining spaced ears or furcations 38. This bifurcated end swings in an arc toward and from the lefthand open or leading end of the handle 8. Attention is now directed to an operating and locking linearly straight link 40 having bolt holes 42 (FIG. 4) and having an end arranged between the furcations and hinged or pivotally secured in place by the insertable and removable pivot pin 44. This pivot pin is held in place by a cotter key 46. The lower end of the link is hinged as at 48 between furcations 50 on the leading or forward end of a push-pull rod 52. This push-pull rod is slidable in the bore of the handle and is of a length greater than the length of the handle and the righthand end portion thereof is provided with an appropriate handgrip 54.

In operation, when it is desired to close the jaws 12 and 28 the handgrip 54 is pulled with one hand relative to the handgrip 10 in the direction of the arrow A. The linkage connection between the push-pull rod and lever-like pivoted end 36 swings the jaw 28 to locked position. By moving the handgrips together in the direction of the arrow B in FIG. 2 the linkage connection swings the movable jaw to open position and also holds it in this position. This self-locking linkage feature is of great advantage in controlling the action of the cooperating jaws.

Reference will now be held to FIGS. 7 to 12, inclusive, and more particularly to FIG. 9 wherein it will be noted that the numeral 60 designates an open-ended tube provided (FIGS. 7 and 8) at a rearward end with a fixed handgrip 62. The reciprocable or push-pull rod which is operable in the tubular handle is denoted by the numeral 64 and the projecting rearward end thereof as shown in FIGS. 7 and 8 is provided with a second relatively movable handgrip 66. The lefthand end of the handle or tube is connected with a composite sheath-like head 68 which is characterized by a pair of spaced parallel plates of identical construction one denoted at 70 (FIG. 10) and the other at 72. The plate 70 as shown in FIG. 10 is provided on its rearward end with a screw-threaded coupling 74 into which the screw-threaded coupling 74 into which the screw-threaded end 76 of the tubular handle 60 is screwed as brought out in FIG. 12. These plates are provided at their forward ends with upstanding spaced parallel mounting ears 78 between which the lug-like part 80 of the movable jaw 82 is pivotally mounted as at 84. This jaw is provided with a longitudinally bowed centrally disposed snout bridging rib 86 and at its outer free end with a lateral curvate beak 88. Before further discussing this jaw reference will now be made to the opposed companion relatively fixed oblique angled jaw 90 which is provided with a lengthwise rib 92 having gripping teeth 94 and provided at its lefthand or free end with a curvate beak 96 which coordinates with the movable beak 88. The shank portion of this jaw is straight and is denoted at 98 and as shown in FIG. 9 it is interposed between the aforementioned plates 70 and 72 which are fastened together with bolts or equivalent fastenings 100. The lengthwise edge 102 of this shank provides a fixed track for the linearly straight rack 104 whose teeth are denoted at 106. The righthand end portion 108 of the rack is fashioned into a screw-threaded shank which is reduced and screwed into a socket provided therefor in the push-pull handle or rod 64. Thus when the part 64 is moved back and forth the rack 104 is slid back and forth on the tracking surface 102. This rack provides one of the significant components of the aforementioned geared linkage which constitutes the operating connection between the reciprocable means 66, 64 and 104, respectively. The rack teeth are such that they mesh with or accommodate complemental rack teeth 108 on a substantially J-shaped motion transmitting link 110 which link has a segmental portion 112 which operates between the ears and which carries the aforementioned teeth 108 which are meshed with the rack teeth 106. The shank portion 114 of this link (also referred to as a cam) is pivotally connected as at 116 between the ends of a pair of cleats 118 which are riveted at 120 on the pivoted or rockable end of the movable jaw 82. It follows that with this reciprocable push-pull handle arrangement when the handgrip 62 is held in one hand and the movable grip 66 is held in the other hand and the push-pull rod is actuated, the jaws 90 and 82 are actuated in proper relationship to each other either to assume the closed locked position shown in FIG. 7, the open locked position shown in FIG. 8 or the intermediate snout gripping locked position shown in FIG. 9. In this embodiment of the invention it will be obvious that the gear linkage serves to impart a steady movement to the movable jaw and in addition constitutes a progressive and continuous locking arrangement. This arrangement is described as a self-locking link. The advantage gained here is that the jaws lock continuously on a graduated or step-by-step principle of operation. The dead-center force between the lever of the movable jaw and gear holds the jaws from opening. This lock principle is, of course, a significant and consequently a key feature of the overall concept and is especially the novelty relied upon in the modified form of the invention comprehended in FIGURES 7 to 12, inclusive.

It is believed that careful consideration of the specification taken in conjunction with the views of the drawings will enable the reader to obtain a full and comprehensive understanding of the overall generic invention, and the species, the features and advantages and best method of using the same. Consequently a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hog restraining implement comprising, in combination, an elongated tubular handle open at distal and proximal ends and provided at its proximal end with an axially aligned fixed handgrip, provided at its distal end with a rigid relatively stationary first jaw linearly straight and pitched from end-to-end at a slight angle to the longitudinal axis of the handle and terminating in a relatively short hook-shaped beak, said handle being provided at the juncture of the rearward end of said stationary jaw and distal end of the handle with a pair of outstanding spaced parallel ears, a second jaw having a median portion positioned between the ears and pivoted and cradled so that a portion thereof is opposed to the first jaw and is movable toward and from it and a rearward end portion projecting beyond the pivot point and marginal portions of said ears, a push-pull rod reciprocable in the bore of said handle and provided with a handgrip at its rearward end adjacent to and movable toward and from the first-named handgrip, a forward part of said push-pull rod being operable in the space between said ears, and a rigid link interposed between said forward part and rearward projecting end of the second jaw and having its respective end portions operatively connected with said rearward projecting end and said forward part, respectively.

2. A hog restraining implement comprising, in combination, an elongated tubular handle open at distal and proximal ends and provided at its proximal end with a fixed handgrip, provided at its distal end with a rigid relatively stationary first jaw linearly straight and pitched at a slight angle to the longitudinal axis of the handle and terminating in a relatively short hook-shaped beak, said handle being provided at the juncture of the rearward end of said stationary jaw and distal end of the handle with a pair of outstanding spaced parallel ears, a second jaw having a median portion positioned between the ears and pivoted and cradled so that a portion thereof is opposed to the first jaw and is movable toward and from it and a rearward end portion projecting beyond the pivot point, that portion between said ears and the distal end of said tubular handle embodying a rigid sheath having a rigid guide track, a linearly straight rack bar in said sheath slidable on said guide track, a J-shaped link having an upper shank portion pivotally connected to the rearward projecting end portion of said second jaw, the pivot point being offset in respect to the first-named pivot point, and having an end portion at the bottom of the shank located between said ears and arcuately curved and provided with gear teeth meshing with the teeth provided therefor on said rack.

3. A hog restraining implement comprising a rigid elongated head embodying a sheath, said sheath having a guide rack and being provided at an outer end portion thereof with a pair of spaced parallel ears, a fixed oblique angled jaw having a shank fixed in said sheath, the jaw proper extending at an oblique angle beyond the forward end of the sheath, a movable jaw opposed to the fixed jaw and having a lug-like portion interposed and pivotally cradled between said ears, a substantially J-shaped link having a shank portion with an upper end pivotally connected to a rear end portion of said movable jaw with the point of pivot offset in respect to the first-named pivotal connection, said link having a lateral arcuate portion located between the ears and marginally provided with gear teeth, a rack bar reciprocable in said sheath and interposed between and slidable on the guide and having rack teeth with which the gear teeth have cooperable connection in a manner to move the leading end of the rack bar either beyond the ears or to retract the same to a position between the ears, handle means connected with said sheath, and additional handle means including a rod slidably mounted and having a leading end portion connected with said rack bar for shifting the rack bar.

4. A hog restraining implement comprising an elongated reach member providing a handle and having a first jaw at an outer distal end, said jaw being straight from end-to-end, rigid and integral with said outer distal end, a second jaw opposed to the first jaw and pivotally mounted on said outer distal end, said second jaw being curved lengthwise and having an outer end terminating in a hooked beak directed toward and projecting to a point slightly beyond the outer end of the first jaw, said jaws being of a length and cooperatively associated to securely embrace the hog's snout, and means carried by said handle for opening and closing said jaws, the inner longitudinal edge of said first jaw having a straight lengthwise rib provided along its snout-gripping edge with integral longitudinally spaced anti-slipping teeth, and the opposed inner lengthwise edge of said second jaw also having a similar cooperating rib, the latter rib being curved lengthwise to conform to the curvature of said first-named jaw.

5. A hog restraining implement comprising an elongated reach member providing a handle and having a first jaw at an outer distal end, said jaw being straight, rigid and integral with said handle, a second jaw opposed to the first jaw and pivotally mounted on said outer distal end, said second jaw being curved lengthwise and having an outer end terminating in a hooked beak directed toward and projecting to a point slightly beyond the outer end of the first jaw, said jaws being of a length and cooperatively associated to securely embrace the hog's snout, a push-pull rod slidingly mounted in said handle, and an operating link interposed between, lateral to said rod and longitudinal axes of said jaws and pivoted at one end on the leading end of said rod and pivotally connected at its other end to an adjacent rearward end of said second jaw, said link having the function of opening and closing said second jaw, and also serving when in a given position to hold said jaws in a normal open ready-to-grip position and relationship.

6. The structure defined in claim 5, and wherein said first jaw is disposed to one side of the axis of the handle and has its own axis at a slight angle oblique to the axis of said handle, the inner lengthwise edge of said first jaw having anti-slipping teeth.

7. An implement of the class described comprising, in combination, an elongated tubular handle open at its forward and rearward ends and provided at the rearward end with an axially positioned handgrip and at the forward end with a stationary jaw, a second jaw opposed to and swingable toward and from the stationary jaw and pivotally supported from the forward end of said handle, a longitudinally shiftable push-pull rod confined and reciprocable in the bore of said handle and projecting through and beyond the rearward end of the handle and provided with a handgrip in axial alignment with the first-named handgrip, the rearward end of said second jaw projecting rearwardly beyond its pivot point and being bifurcated and providing furcations, the leading end of the push-pull rod having similar furcations, and a link having its ends pivotally joined to the respective furcations, said link being lateral to and interposed between the aforementioned furcations, being of a length to open and close the second jaw in response to the movement of the push-pull rod and also serving to lock the movable jaw in a normally open position when necessary or desired.

References Cited in the file of this patent

UNITED STATES PATENTS

| | | |
|---|---|---|
| 582,293 | Koester | May 11, 1897 |
| 983,038 | Ferris | Jan. 31, 1911 |
| 2,759,758 | Yancy | Aug. 21, 1956 |

FOREIGN PATENTS

| | | |
|---|---|---|
| 540,430 | Great Britain | Oct. 16, 1941 |